UNITED STATES PATENT OFFICE.

ARTHUR D. CURRAN, OF PHILADELPHIA, PENNSYLVANIA.

MANUFACTURE OF LIQUID CARAMELS.

SPECIFICATION forming part of Letters Patent No. 236,991, dated January 25, 1881.

Application filed December 13, 1880. (No specimens.)

*To all whom it may concern:*

Be it known that I, ARTHUR D. CURRAN, of the city and county of Philadelphia and State of Pennsylvania, have invented an Improvement in the Manufacture of Liquid Caramel, of which the following is a specification.

My invention relates to the manufacture of caramel in the liquid state; and my improved process consists in mixing together sugar, cream or its equivalent, and glucose in proper proportions, that when they have been cooked or boiled to a certain degree and for a certain length of time the compound thus made will be a liquid caramel which can be kept for an indefinite period of time without solidifying; and my invention further consists in the compound so produced as an article of manufacture.

Heretofore caramels have been placed upon the market in a perfectly solid condition, and never to my knowledge has a liquid caramel been known or made prior to the date of my invention.

The process of making caramels as heretofore developed has been, in most cases, imperfect, producing poor caramels, and in no case has the process been carried on in such a manner that a liquid product would be the result. Those manufacturers who have good recipes keep them to themselves, and the smaller dealers must, of necessity, pay a large price for a good product; and since the solid caramel will soon become stale, it is absolutely necessary to buy fresh stock continually, as they cannot produce a good article themselves.

The object of my invention is the production of a liquid caramel as an article of manufacture and commerce which can be put up in quantities of from one-pound cans or under to casks containing one hundred pounds or over, and which can be sold to the trade as a prepared article from which the finest solid caramels can be produced by any novice in a few minutes; that the prepared article in the liquid state shall be capable of withstanding the influence of the atmosphere and remain liquid for an indefinite period of time, and that it shall be of such a nature that any quantity, large or small, of fresh caramels can be made with any flavor daily in the smallest store without skilled labor and at a very much reduced expense.

In carrying out my invention I mix together from one and one-half to five gallons of cream, or its equivalent, twenty pounds of sugar, and from two to twelve pounds of glucose, or sufficient to render the product liquid when boiled to about a half-completed state for solid caramels and cooled, and then boil or heat the same for a period of time which varies slightly under different conditions, and until the product is brought to a semi-liquid condition, which time is about one-half that required to bring the caramel to a solid or complete state. The cream may be added at the beginning, or gradually from that period to the completion of the liquid product. The product may be flavored with any of the well-known flavors, either before or after the completion of the product. In the case of chocolate I prefer to add it during the process of making the liquid product. In general I prefer to dispense with addition of the flavoring constituent, leaving it to the option of the retailer to flavor it to suit himself and his customers. One advantage of this would be that he would only be required to buy a quantity of liquid material unflavored, from which he could manufacture any flavored caramels he desired, while, on the other hand, he would be required to buy a stock of each flavored product. The proportions given will produce a permanently liquid product, provided the boiling is arrested before completion of a solid product, and will remain as a solution or liquid until boiled to completion by the consumer, when it will produce a fine solid caramel.

The essential feature of my invention is the production of a permanently or comparatively permanently liquid product, which can be placed on the market in this liquid state, and from which a fine quality of solid caramel can be produced by any one not versed in the art of the candy manufacture.

Having now described my invention, what I claim as new, and desire to secure by Letters Patent, is—

1. As a new article of manufacture, the herein-described liquid-caramel compound, which consists, in its unflavored state, of the product produced by boiling together sugar, cream or its equivalent, and glucose, and arresting such boiling at a period before completion of a solid product, substantially as and for the purpose specified.

2. The herein-described process for the manufacture of a liquid-caramel compound, consisting in mixing together sugar and cream or its equivalent, and adding thereto sufficient glucose to make a liquid compound after boiling, and boiling the same to an incomplete state, or a state which would not produce solid caramel, substantially as and for the purpose specified.

In testimony of which invention I hereunto set my hand.

ARTHUR D. CURRAN.

Witnesses:
R. M. HUNTER,
SAMUEL E. CAVIN.